United States Patent
Park et al.

(10) Patent No.: US 12,527,806 B2
(45) Date of Patent: Jan. 20, 2026

(54) COMPOSITION FOR PREVENTING OR TREATING DIABETES MELLITUS

(71) Applicants: SEOUL NATIONAL UNIVERSITY R&DB FOUNDATION, Seoul (KR); SEOUL NATIONAL UNIVERSITY HOSPITAL, Seoul (KR)

(72) Inventors: Kyong Soo Park, Seoul (KR); Seung-Ah Lee, Gyeonggi-do (KR); Sung Soo Chung, Seoul (KR)

(73) Assignees: SEOUL NATIONAL UNIVERSITY R&DB FOUNDATION, Seoul (KR); Seoul National University Hospital, Seoul (KR)

( * ) Notice: Subject to any disclaimer, the term of this patent is extended or adjusted under 35 U.S.C. 154(b) by 736 days.

(21) Appl. No.: 17/820,387

(22) Filed: Aug. 17, 2022

(65) Prior Publication Data

US 2022/0387450 A1 Dec. 8, 2022

Related U.S. Application Data

(63) Continuation-in-part of application No. PCT/KR2021/002028, filed on Feb. 17, 2021.

(30) Foreign Application Priority Data

Feb. 17, 2020 (KR) .................. 10-2020-0019298
Sep. 11, 2020 (KR) .................. 10-2020-0116891

(51) Int. Cl.
*A61K 31/575* (2006.01)
*A61K 31/132* (2006.01)
(Continued)

(52) U.S. Cl.
CPC .......... *A61K 31/575* (2013.01); *A61K 31/132* (2013.01); *A61K 31/395* (2013.01);
(Continued)

(58) Field of Classification Search
CPC .. A61K 31/132; A61K 31/395; A61K 31/455; A61K 31/575; A61K 31/58;
(Continued)

(56) References Cited

U.S. PATENT DOCUMENTS

| | | | |
|---|---|---|---|
| 6,794,414 B1 * | 9/2004 | Steinman | C12N 9/1044 514/513 |
| 7,144,863 B2 | 12/2006 | DeFelippis | |
| 2023/0088644 A1 * | 3/2023 | Park | A61K 35/14 435/377 |

FOREIGN PATENT DOCUMENTS

| | | |
|---|---|---|
| KR | 100851040 | 8/2008 |
| KR | 20130134096 | 12/2013 |
| KR | 20140071583 | * 7/2014 |

OTHER PUBLICATIONS

Park and Kim (, Biomedical Science letters, 2012, vol. 18, No. 3, pp. 193-200 (Year: 2012).*

(Continued)

*Primary Examiner* — Savitha M Rao
(74) *Attorney, Agent, or Firm* — Riverside Law LLP

(57) ABSTRACT

The present invention relates to a composition for preventing or treating diabetes mellitus using a 4-component mixture of putrescine, glucosamine, nicotinamide, and a STAT3 inhibitor. It has been confirmed that blood glucose is stably regulated when a compound of the 4-component mixture according to the present invention is injected into the caudal vein of a diabetes mellitus-induced mouse. The compound can be practically and usefully used as a therapeutic agent for diabetes mellitus patients and patients exposed to diabetes mellitus risk.

13 Claims, 17 Drawing Sheets
Specification includes a Sequence Listing.

(51) Int. Cl.
*A61K 31/395* (2006.01)
*A61K 31/455* (2006.01)
*A61K 31/58* (2006.01)
*A61K 31/609* (2006.01)
*A61K 31/7008* (2006.01)
*A61K 38/19* (2006.01)
*A61P 3/10* (2006.01)

(52) U.S. Cl.
CPC ............ *A61K 31/455* (2013.01); *A61K 31/58* (2013.01); *A61K 31/609* (2013.01); *A61K 31/7008* (2013.01); *A61K 38/193* (2013.01); *A61P 3/10* (2018.01)

(58) Field of Classification Search
CPC .............. A61K 31/609; A61K 31/7008; A61K 38/193; A61P 3/10
See application file for complete search history.

(56) References Cited

OTHER PUBLICATIONS

Alenzi (Iran J Allergy Asthma Immunol, Mar. 2009; 8(1): 11-18) (Year: 200).*
Miura et al. (EBioMedicnie, 35, 2018 pp. 358-366) (Year: 2018).*
Kim (KR 20140071583, see English translation (Year: 2014).*

* cited by examiner

COMPOSITION FOR PREVENTING OR TREATING DIABETES MELLITUS

CROSS REFERENCE TO RELATED APPLICATIONS

This application claims priority to International Patent Application No. PCT/KR2021/002028, filed Feb. 17, 2021, claiming priority to Korean Application No. 10-2020-0116891, filed Sep. 11, 2020 and Korean Application No. 10-2020-0019298 filed Feb. 17, 2020, each of which is hereby incorporated by reference herein in its entirety.

REFERENCE TO A "SEQUENCE LISTING," A TABLE, OR A COMPUTER PROGRAM LISTING APPENDIX

The Sequence Listing written in the XML file: "206132-0129-00US_SequenceListing.xml"; created on Aug. 17, 2022, and 11,713 bytes in size, is hereby incorporated by reference.

TECHNICAL FIELD

The present invention relates to a composition for alleviating, preventing, or treating diabetes mellitus, and more specifically, to a composition for alleviating, preventing, or treating diabetes mellitus, comprising putrescine, glucosamine, nicotinamide and a STAT3 inhibitor as active ingredients.

BACKGROUND ART

Diabetes mellitus is a type of metabolic disorder, characterized by high blood glucose levels resulted from defects in insulin secretion, insulin resistance, or a combination of both factors.

Diabetes mellitus is broadly divided into two major forms, type 1 and type 2. While type 1 diabetes mellitus is a disease caused by the body's inability to produce insulin, type 2 diabetes mellitus is characterized by insulin resistance (inability of cells to effectively uptake glucose from blood for energy.

Diabetes mellitus causes serious chronic vascular complications which may result in blindness, end stage renal disease, limb amputation and atherosclerotic cardiovascular disease such as myocardial infarction or ischemic stroke. Therefore, intensive and comprehensive management of diabetes mellitus is required to reduce health burden associated with diabetes mellitus and its complications.

Management of type 1 diabetes who has absolute insulin deficiency requires physiologic insulin replacement such as multiple subcutaneous insulin injections of prandial and basal insulin or continuous subcutaneous insulin infusion. Management of type 2 diabetes mellitus includes lifestyle modification and pharmacological therapy. Pharmacological management of type 2 diabetes mellitus has evolved very rapidly with recent development of new pharmacological agents such as incretin mimetics and SGLT2 inhibitors. Despite of intensive glycemic management, most of T2D patients showed decline of beta cell function over years. Thus, many investigators has been trying to find ways to increase or at least maintain beta cell mass and to improve glycemic control.

DISCLOSURE

Technical Problem

The present invention has been made in an effort to solve the aforementioned problems in the related art, and an object thereof is to provide a composition for alleviating, preventing or treating diabetes mellitus, comprising putrescine, glucosamine, nicotinamide and a STAT3 inhibitor, which are capable of effectively treating diabetes mellitus, as active ingredients.

However, the technical problems in which the present invention intends to solve are not limited to the technical problems which have been mentioned above, and other technical problems which have not been mentioned will be apparently understood by a person with ordinary skill in the art to which the present invention pertains from the following description.

Technical Solution

The present invention provides a pharmaceutical composition for preventing or treating diabetes mellitus, comprising one or more selected from the group consisting of putrescine, glucosamine, nicotinamide, and a STAT3 inhibitor as active ingredients.

Further, the present invention provides a food composition for preventing or alleviating diabetes mellitus, comprising one or more selected from the group consisting of putrescine, glucosamine, nicotinamide, and a STAT3 inhibitor as active ingredients.

In addition, the present invention provides a composition for lowering blood glucose, comprising one or more selected from the group consisting of putrescine, glucosamine, nicotinamide, and a STAT3 inhibitor as active ingredients.

In an exemplary embodiment of the present invention, the STAT3 inhibitor may be preferably one or more selected from the group consisting of JSI-124, BP-1-102, and cryptotanshinone (CPT), but is not limited thereto as long as it is an inhibitor known to suppress the activity of signal transducer and activator of transcription 3 (STAT3).

In another exemplary embodiment of the present invention, the composition may additionally comprise a stem cell mobilizing factor that serves to mobilize bone marrow-derived stem cells to peripheral blood, the stem cell mobilizing factor may be preferably any one or more selected from the group consisting of a granulocyte colony-stimulating factor (G-CSF), plerixafor (AMD3100), and tauroursodeoxycholic acid (TUDCA), but is not limited thereto as long as it is a material which mobilizes stem cells to peripheral blood. The stem cell mobilizing factor may be administered at 1 to 1000 μg/kg, 10 to 1000 μg/kg, 200 to 500 μg/kg, or 200 to 300 μg/kg, but the dose is not limited thereto as long as it is a generally used dose.

In still another exemplary embodiment of the present invention, the diabetes mellitus may be insulin-dependent type 1 diabetes mellitus or insulin-independent type 2 diabetes mellitus.

In yet another exemplary embodiment of the present invention, the composition may increase insulin secretion and exhibit the ability to regulate blood glucose by promoting the differentiation of bone marrow-derived stem cells into insulin-producing cells.

In yet another exemplary embodiment of the present invention, the putrescine may be included at a concentration of 1 to 20 mM, preferably 5 to 15 mM, and more preferably 7 to 13 mM. Furthermore, the glucosamine may be included at a concentration of 1 to 20 mM, preferably 5 to 15 mM, and more preferably 7 to 13 mM. Further, the nicotinamide may be included at a concentration of 1 to 20 mM, preferably 5 to 15 mM, and more preferably 7 to 13 mM. The STAT3 inhibitor may be included at a concentration of 0.1 to 30 µM, preferably 0.5 to 20 µM, more preferably 1 to 15 µM, and even more preferably 5 to 10 µM. A composition comprising putrescine, glucosamine, nicotinamide, and a STAT3 inhibitor in the above concentration range has an excellent effect of preventing, alleviating, and/or treating diabetes mellitus or an excellent effect of lowering blood glucose compared to a composition comprising putrescine, glucosamine, nicotinamide, and a STAT3 inhibitor outside of the above concentration range.

In addition, the present invention provides a method for preventing or treating diabetes mellitus, the method comprising: administering a composition comprising putrescine, glucosamine, nicotinamide, and a STAT3 inhibitor as active ingredients to a subject in need thereof.

Furthermore, the present invention provides a use of a composition comprising putrescine, glucosamine, nicotinamide, and a STAT3 inhibitor as active ingredients for alleviating, preventing or treating diabetes mellitus.

Further, the present invention provides a use of a composition comprising putrescine, glucosamine, nicotinamide, and a STAT3 inhibitor as active ingredients for producing a drug used for a disease requiring the regulation of blood glucose.

Advantageous Effects

The composition comprising putrescine, glucosamine, nicotinamide, and a STAT3 inhibitor as active ingredients according to the present invention reacts with bone marrow-derived stem cells mobilized to peripheral blood due to pancreatic islet damage to promote differentiation into insulin-producing cells, and differentiated insulin-producing cells are stably engrafted in the pancreatic islets and small intestine to increase insulin secretion and effectively exhibit the ability to regulate blood glucose. In addition, the use of an additional mixture of stem cell mobilizing factors is expected to promote the migration of bone marrow-derived stem cells to peripheral blood to further increase the therapeutic effect thereof. Therefore, the composition comprising putrescine, glucosamine, nicotinamide, and a STAT3 inhibitor as active ingredients according to the present invention can be used for effectively preventing, alleviating, and/or treating diabetes mellitus without any side effects.

MODES OF THE INVENTION

Figure 1:
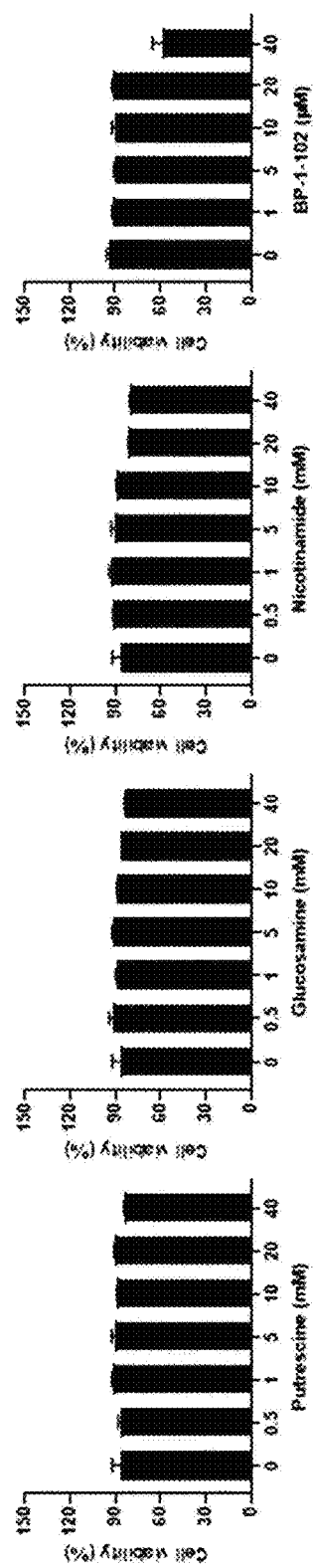
FIG. 1 is a view illustrating the results of examining cytotoxic effect for each of four differentiation-inducing factors in MIN-6 cells at the indicated different concentrations of putrescine, glucosamine, nicotinamide, and a STAT3 inhibitor for 24 h according to an exemplary embodiment of the present invention.

It was confirmed that the composition comprising putrescine, glucosamine, nicotinamide, and a STAT3 inhibitor as active ingredients according to the present invention reacts with bone marrow-derived stem cells to promote differentiation into insulin-producing cells, and the insulin-producing cells are stably engrafted in the pancreatic islets and small intestine to increase insulin secretion and exhibit the ability to regulate blood glucose. In addition, it was determined that the composition does not exhibit cytotoxicity. Therefore, it could be confirmed that the composition comprising putrescine, glucosamine, nicotinamide, and a STAT3 inhibitor as active ingredients according to the present invention may be effectively used for the treatment of diabetes mellitus.

As used herein, "insulin resistance" refers to a phenomenon that generally occurs prior to the onset of diabetes mellitus, and obesity is known as a triggering factor for diabetes mellitus associated with insulin resistance. An increase in circulating fatty acids in obese patients causes fat accumulation in the liver and muscles. At the same time, it causes lipotoxicity, which in turn leads to insulin resistance. The tissues where fatty acid oxidation mostly occurs are muscles, and therefore, if the fatty acid oxidation capacity could be increased in muscle, which occupies a large proportion in the body, obesity and insulin resistance may be reduced, and consequently, the onset of diabetes mellitus could be suppressed.

As used herein, "lowering blood glucose" refers to the effect of lowering the blood glucose, which is a numerical value indicating the concentration of glucose in blood. It is desirable for the human body to maintain blood glucose levels within a certain range in order to maintain homeostasis. Hyperglycemia, or high blood glucose, occurs temporarily after meals. It is called physiological hyperglycemia as a natural phenomenon. However, if the blood glucose level exceeds this range, or the hyperglycemic state continues, it is highly likely that diabetes has developed, that there is a possibility that it may progress to diabetes, or that diabetes has developed but has not been detected. The US Food and Drug Administration stipulates that a normal blood glucose level is a fasting blood glucose of less than 100 mg/dL and a 2-hour postprandial blood glucose of less than 140 mg/dL, and a person is diagnosed with diabetes mellitus when he or she shows a fasting blood glucose of 126 mg/dL or more and a 2-hour postprandial blood glucose of 200 mg/dL or more. Meanwhile, WHO defines a fasting blood glucose less than 110 mg/dL as a normal level. When the hyperglycemic state is maintained, even though it is below the level diagnosed as diabetes, it increases the risk of inducing fatty liver and the risk of progression to severe liver disease, which can lead to cardiovascular disease and its complications. Glucagon, adrenaline, insulin, thyroid hormones, and the like work in the body to maintain normal blood glucose levels. Abnormalities in the secretion and/or activity of such hormones may lead to hyperglycemia. Furthermore, excessive sugar intake, lack of exercise and/or stress may also cause hyperglycemia.

As used herein, "diabetes or diabetes mellitus" refers to a metabolic disease such as insufficient secretion of insulin or malfunction of insulin.

In the present specification, "putrescine" is "1,4-diaminobutane or 1,4-butanediamine," and a type of polyamine found in an entire range of organisms from bacteria to animals and plants, and it is known that putrescine plays an important role in cell proliferation and normal cell growth and is an important material for defense mechanisms against oxidative stress.

In the present specification, "glucosamine" is a type of amino sugar that is a major precursor of biochemical binding between glycoproteins and glycolipids, and forms a part of a polysaccharide structure such as chitosan or chitin, which are the main components constituting the exoskeletons of various arthropods including crustaceans and the cell walls of fungi.

As used herein, "nicotinamide" refers to a material which is a type of vitamin B called vitamin pellagra preventive (PP). Nicotinamide is a component of nicotinamide adenine dinucleotide (NAD) and nicotinamide adenine dinucleotide phosphate (NADP), which are two important hydrogen transfer co-enzymes in vivo, is known to be involved in the physiological actions of various enzymes, and is known to be effective for alleviating nerve regression caused by Alzheimer's disease and stroke.

As used herein, "signal transducer and transcriptions (STAT)" refers to transcription factors with seven subunit forms: STAT1, STAT2, STAT3, STAT4, STAT5a, STAT5b, and STAT6, and in particular, STAT3 is a transcriptional regulator that is continuously activated through various pathways and serves to promote tumorigenesis, is involved in the transcription of various genes in cells, and responds to external signaling by cytokines or growth factors in normal cases, and as a result, STAT3, present in the cytoplasm, migrates into the nucleus to regulate genes for cell development, differentiation, growth, survival, angiogenesis, immune functions, and the like.

The STAT3 inhibitor may be one or more selected from the group consisting of JSI-124 (Cas No. 2222-07-3), BP-1-102 (Cas No. 1334493-07-0), cryptotanshinone (CPT), 8-hydroxy-3-methyl-3,4-dihydrotetraphene-1,7,12(2H)-trione (STA-21), (E)-2-cyano-3-(3,4-dihydrophenyl)-N-(phenylmethyl)-2-propenamide (AG490), 3-(8,8-dipropyl-3-azaspiro[4.5]decan-3-yl)-N,N-diethylpropan-1-amine (atiprimod), 3,4,5-triacetyloxy-6-(acetyloxymethyl) oxane-2-thiolate (auranofin; trimethylphosphonium), sodium 2-(auriosulfanyl)-3-carboxypropanoate (aurothiomalate), N-(2-chloro-6-methylphenyl)-2-[[6-[4-(2-hydroxyethyl)-1-piperazinyl]-2-methyl-4 pyrimidinyl]amino]-5-thiazole carboxamide monohydrate (BMS 354825; dasatinib), 3-(3,4-dihydroxy-phenyl)-acrylic acid 2-(3,4-dihydroxy-phenyl)-ethyl ester (CADPE), 6-nitro-1,1-dioxide-benzo[b]thiophene (Stattic), calcium 2,5-dihydroxybenzenesulfonate (dobesilate), ethanol, NCX-4016(NO-Aspirin), (3S,4aS,8aS)—N-tertbutyl-2-[(2R,3R)-2-hydroxy-3-[(3-hydroxy-2-methylphenyl)formamido]-4-(phenylsulfanyl)butyl]-decahydroisoquinoline-3-carboxamide (nelfinavir), phosphododecapeptide (PDP), (1R)-3-methyl-1-({(2S)-3-phenyl-2-[(pyrazin-2-ylcarbonyl)amino]propanoyl}amino) butyl]boronic acid (PS-341; bortezomib), 6-[amino(4-chlorophenyl)(1-methyl-1H-imidazol-5-yl)methyl]-4-(3-chlorophenyl)-1-methylquinolin-2(1H)-one (R115777; tipifarnib), N-hexyl-2-(1-naphthalenyl)-5-[[4-(phosphonooxy)phenyl] (S31-M2001), a statin-based compound, sodium salicylate, 3-(3,4-dihydroxyphenyl)-2-propenoic acid 3,4-dihydroxy-cinnamic acid trans-caffeate 3,4-dihydroxytrans-cinnamate (caffeic acid), 1,8-dihydroxy-3-(hydroxymethyl)-9,10-anthracenedione (emodin), 3-beta-3-hydroxy-urs-12-ene-28-oic-acid (ursolic acid), 3,5,4'- trihydroxytrans-stilbene (resveratrol), (2E,4E,6E,8E)-3,7-dimethyl-9-(2,6,6-trimethylcyclohexen-1-yl)nona-2,4,6,8-tetraenoic acid (retinoic acid), (2R,3R)-5,7-dihydroxy-2-(3,4,5-trihydroxyphenyl)chroman-3-yl] 3,4,5-trihydroxybenzoate (epigallocatechingallate (EGCG)), (E,E,Z,E)-3-methyl-7-(4-methylphenyl)-9-(2,6,6-trimethyl-1-cyclohexen-1-yl)-2,4,6,8-nonatetraenoic acid (Sr11302), 1,6,6-trimethyl-6,7,8,9-tetrahydrophenanthro[1,2-b]furan-10,11-dione (tanshinone IIA), and (1E,6E)-1,7-bis(4-hydroxy-3-methoxyphenyl)-1,6-heptadiene-3,5-dione (curcumin).

As used herein, "prevention" refers to all actions that suppress diabetes mellitus or delay the onset of the diabetes mellitus through administration of the composition according to the present invention.

As used herein, "treatment" refers to all actions through which symptoms of diabetes mellitus are ameliorated or advantageously changed by administering the composition according to the present invention.

As used herein, "alleviation" refers to all actions that at least reduce a parameter associated with a condition to be treated, for example, the degree of symptoms. In this case, the composition of the present invention may be used simultaneously with or separately from a drug for treatment for the prevention or alleviation of diabetes mellitus.

As used herein, "subject" refers to a subject to whom the composition of the invention can be administered, preferably a patient who has diabetes mellitus or is at risk of developing diabetes mellitus, but is not limited to such a target. For example, the subject may be livestock such as a cow, a pig, a sheep, a horse, a dog, or a cat in addition to a human or a primate.

As used herein, the "pharmaceutical composition" may be in the form of a capsule, a tablet, a granule, an injection, an ointment, a powder, or a beverage, and the pharmaceutical composition may target humans. The pharmaceutical composition of the present invention may include a pharmaceutically acceptable carrier. As the pharmaceutically acceptable carrier, a binder, a lubricant, a disintegrant, an excipient, a solubilizing agent, a dispersing agent, a stabilizer, a suspending agent, a colorant, a flavoring agent, and the like may be used when orally administered, in the case of injection, a buffering agent, a preservative, an analgesic, a solubilizer, an isotonic agent, a stabilizer, and the like may be mixed and used, and in the case of topical administration, a base, an excipient, a lubricant, a preservative, and the like may be used. The formulation of the pharmaceutical composition of the present invention may be variously prepared by mixing the pharmaceutical composition of the present invention with the pharmaceutically acceptable carrier as described above. For example, the formulation may be prepared in the form of a tablet, a troche, a capsule, an elixir, a suspension, a syrup, a wafer, and the like when orally administered, and in the case of injection, the injection may be formulated into unit dosage ampoules or in multiple dosage forms. The pharmaceutical composition of the present invention may also be used by being formulated into other sugar-coated tablets, gels, pills, powders, granules, suppositories, external preparations, solutions, suspensions, sustained-release preparations, slurries, and the like. Meanwhile, as an example of suitable carriers, excipients and diluents for formulation, it is possible to use lactose, dextrose, sucrose, sorbitol, mannitol, xylitol, erythritol, maltitol, starch, acacia rubber, alginate, gelatin, calcium phosphate, calcium silicate, cellulose, methylcellulose, microcrystalline cellulose, polyvinylpyrrolidone, water, methylhydroxybenzoate, propylhydroxybenzoate, talc, magnesium stearate, mineral oil, or the like. Further, the pharmaceutical composition of the present invention may further include a filler, an anticoagulant, a lubricant, a wetting agent, a flavoring agent, an emulsifying agent, an antiseptic, and the like.

The route of administration of the pharmaceutical composition according to the present invention is not limited to the following routes, but oral or parenteral administration is preferred, and for example, oral, intravenous, intramuscular, intraarticular, intrasynovial, intraarterial, intramedullary, intrathecal, intracardiac, percutaneous, intradermal, subcutaneous, intraperitoneal, intranasal, intestinal, topical, sublingual, rectal, intrasternal, intralesional, intracranial, and the like are included.

The dosage of the pharmaceutical composition of the present invention may vary depending on various factors including the activity of the specific compound used, age, body weight, general health, sex, diet, time of administration, route of administration, rate of excretion, drug combination and the severity of the particular disease to be prevented or treated, and varies depending on the condition, body weight, and the degree of disease of the patient, the form of drug, the route of administration and duration, but may be appropriately selected by a person skilled in the art, and may be 0.0001 to 500 mg/kg or 0.001 to 500 mg/kg daily. The administration may be carried out once daily, or may be divided into several times. The dosage is not intended to limit the scope of the present invention in any way.

In the present specification, the "food composition" may be used for various foods, for example, beverages, gums, teas, vitamin composites, and health-supplementary foods, and may be used in the form of a pill, a powder, a granule, an infusum, a tablet, a capsule, or a beverage. The food composition includes a health functional food composition. "Functional food" refers to a food manufactured and processed using raw materials or ingredients that have functional properties that are useful for the human body according to Act No. 6727 on functional foods, and is meant to be taken for the purpose of regulating nutrients to the structure and function of the human body, or obtaining effects useful for public health use, such as physiological effects. In this case, the amount of the composition of the present invention in a food or a beverage may be 0.01 to 30 wt % based on the weight of the entire food in the case of the food composition of the present invention, and in the case of the health beverage composition, a ratio of 0.02 to 10 g, preferably 0.3 to 1 g, based on 100 mL may be added.

The food composition of the present invention has no particular limitation in an ingredient to be added in addition to the composition of the present as an essential ingredient, and may include typical food additives used in the art, for example, natural carbohydrates, flavorants, flavoring agents, colorants, fillers, stabilizers, various nutrients, vitamins, minerals (electrolytes) and the like. As an example of the natural carbohydrates, typical sugars such as monosaccharides, for example, glucose, fructose and the like; disaccharides, for example, maltose, sucrose and the like; and polysaccharides, for example, dextrin, cyclodextrin and the like, and sugar alcohols such as xylitol, sorbitol, and erythritol may be used. As an example of the flavorant, a natural flavorant (thaumatin, stevia extract (for example, Rebaudioside A, glycyrrhizin and the like), and a synthetic flavorant (saccharin, aspartame and the like) may be advantageously used. As an example of the flavoring agent, honey, D-mannitol, a maltitol solution, a krill concentrate, and the like may be used. In addition to those, the food composition of the present invention may contain pectic acids and salts thereof, alginic acid and salts thereof, organic acids, protective colloid thickeners, pH adjusters, stabilizers, preservatives, glycerin, alcohols, carbonating agents used in carbonated drinks, and the like. These ingredients may be used either alone or in combinations thereof. The proportion of these additives is not significantly important, but is generally selected within a range of 0 to 20 parts by weight per 100 parts by weight of the composition of the present invention.

Hereinafter, preferred examples for helping with understanding of the present invention will be suggested. However, the following examples are provided only so that the present invention may be more easily understood, and the content of the present invention is not limited by the following examples.

EXAMPLES

Example 1: Examination of Cytotoxic Effect of Putrescine, Glucosamine, Nicotinamide, and a STAT3 Inhibitor The cytotoxic effect of putrescine, glucosamine, nicotinamide, and a STAT3 inhibitor was investigated in pancreatic beta cell line, MIN-6. MIN-6 cells were seeded into a 96-well plate to $5 \times 10^4$ cells/well in a Dulbecco's Modified Eagle's Medium (DMEM) supplemented with 15% fetal bovine serum (FBS), 11 mM glucose, and antibiotics, and cultured for 48 hours for confluency. Then, putrescine, glucosamine, and nicotinamide were treated to the cultured cells for 24 hours with various concentrations of 0.5 mM to 40 mM of each factor. BP-1-102, a STAT3 inhibitor, was treated with various concentrations of 1 μM to 40 μM, to the cells for 24 hours, and then the cell lysates were prepared. After the prepared cell lysates were treated with an AOPI solution, cell viability was measured using a cellometer K2 fluorescent viability cell counter (Nexcelom Bioscience LLC). The results are illustrated in FIG. 1.

As illustrated in FIG. 1, it was shown that none of putrescine, glucosamine, and nicotinamide showed a significant difference in cell viability at the indicated concentrations, and based on the result, it was confirmed that putrescine, glucosamine, and nicotinamide did not show cytotoxicity at the corresponding concentrations. In the case of BP-1-102, no cytotoxicity was shown up to 20 μM, but at 40 μM, the cell viability was decreased to about 59%, suggesting that 40 μM of BP-1-102 showed cytotoxicity.

Then, in order to investigate whether the concomitant administration of putrescine, glucosamine, nicotinamide, and a STAT3 inhibitor shows cytotoxicity, the cell viability was measured using the combination of the factors. The results are illustrated in FIG. 2.

Figure 2:
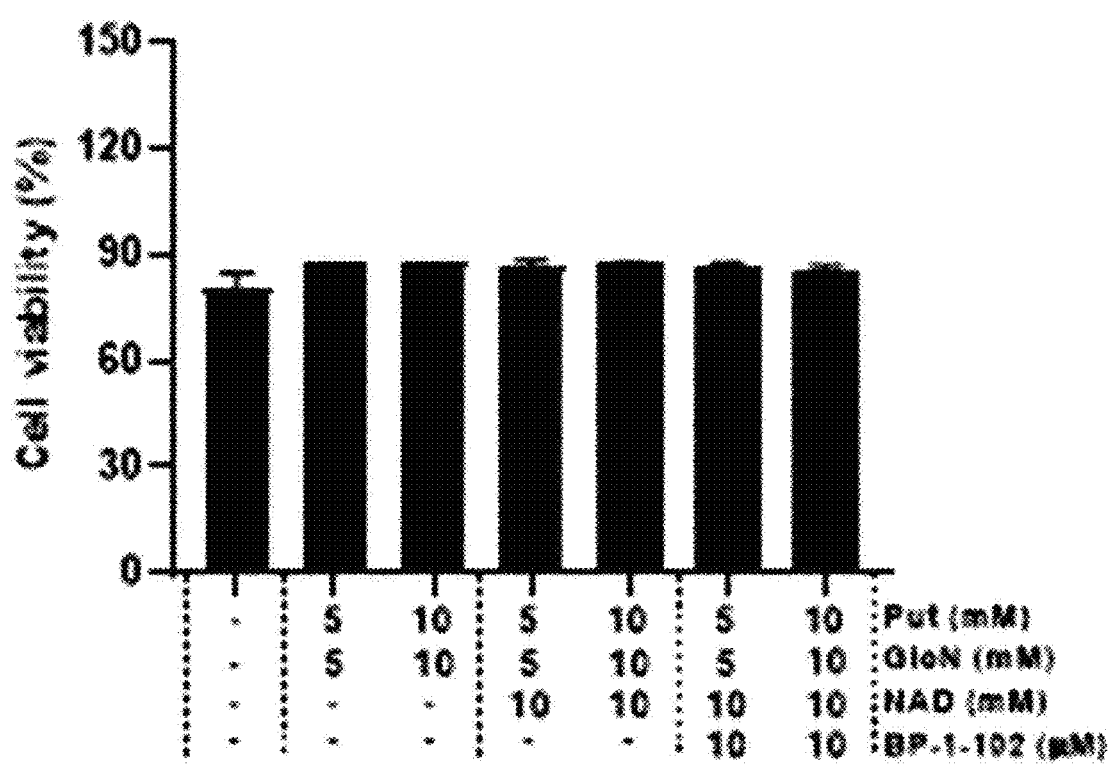
FIG. 2 is a view illustrating the results of measuring cytotoxic effect for different combinations of four differentiation-inducing factors at the indicated concentrations for 24 h according to an exemplary embodiment of the present invention.

As illustrated in FIG. 2, it was determined that no cytotoxicity was exhibited even in the concomitant administration of four factors, indicating that the composition of the present invention is safe and could be used as a pharmaceutical composition for preventing or treating diabetes mellitus.

Example 2: Functional Effect of Putrescine, Glucosamine, Nicotinamide, and a STAT3 Inhibitor on Glucose-Stimulated Insulin Secretion

2.1. Increase in Insulin Secretion in Mouse Pancreatic Beta Cell Line

In order to investigate the effect of concomitant administration of putrescine, glucosamine, nicotinamide, and a STAT3 inhibitor on insulin secretion, MIN-6 cells were seeded into a 96-well plate to $5 \times 10^4$ cells/well, and cultured for 48 hours for confluency. Then, putrescine, glucosamine, and nicotinamide each at a final concentration of 10 mM and 10 μM of BP-1-102 were mixed and treated to the cultured cells for 4 hours. The cells were pre-incubated for 2 hours in a glucose-free culture medium for glucose starvation. After that, the cells were additionally pre-incubated for 30 minutes in a Krebs-Ringer-HEPES (KRH) solution (119 mM NaCl, 4.74 mM KCl, 2.54 mM $CaCl_2$, 1.19 mM $KH_2PO_4$, 1.19 mM $MgCl_2$, 10 mM HEPES, 25 mM $NaHCO_3$, 0.2% BSA, and 2 mM glucose) and then incubated in a KRH solution containing 2- or 16.8-mM glucose for 30 minutes, respectively. Then, each supernatant from the cells had been removed, and the insulin released into the supernatant was measured using the Mouse Ultrasensitive Insulin ELISA kit (ALPCO). As a control (CTL), MIN-6 cells which had not been treated with putrescine, glucosamine, nicotinamide, and a STAT3 inhibitor were used. The results are illustrated in FIG. 3.

Figure 3:
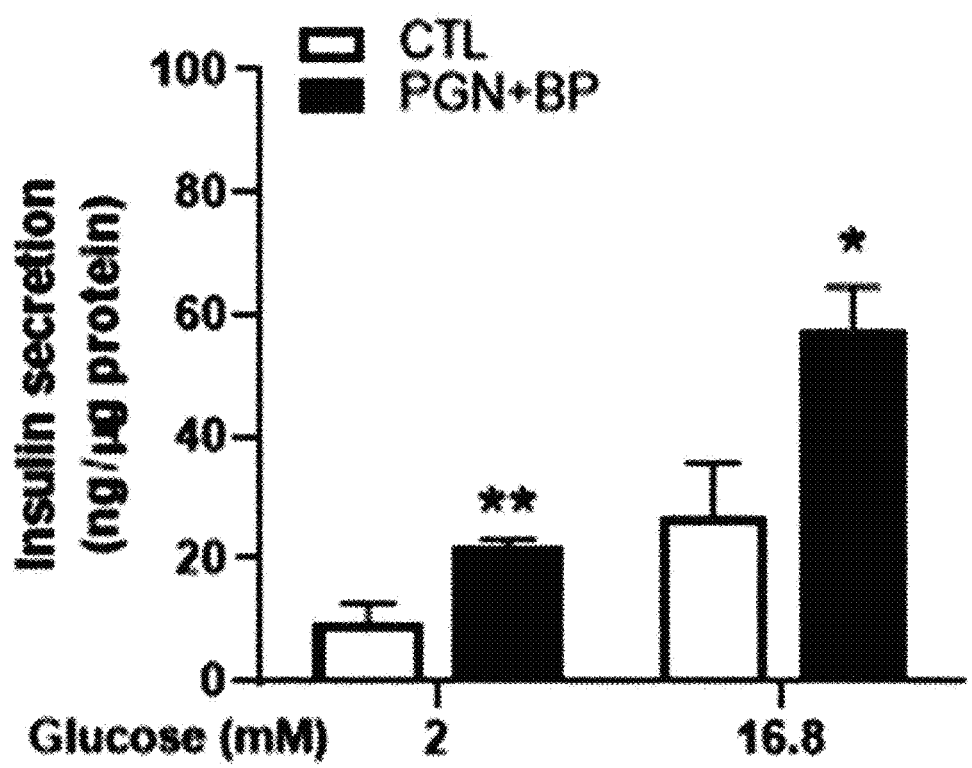
FIG. 3 is a view illustrating the results of examining the functional effects of the concomitant administration of putrescine, glucosamine, nicotinamide, and a STAT3 inhibitor in MIN-6 cells on glucose-stimulated insulin release according to an exemplary embodiment of the present invention. Insulin secretion was measured by ultrasensitive ELISA.

As illustrated in FIG. 3, it was observed that the concomitant administration of putrescine, glucosamine, nicotinamide and a STAT3 inhibitor increased insulin secretion significantly in both low (2 mM) and high (16.8 mM) glucose-stimulated conditions than controls. Insulin secretion in the treated cells was 4.6-fold and 3.9-fold higher than that in the non-treated cells under the low and high glucose conditions, respectively.

2.2. Confirmation of Expression Levels of Insulin Secretion-Related Genes

Figure 4:
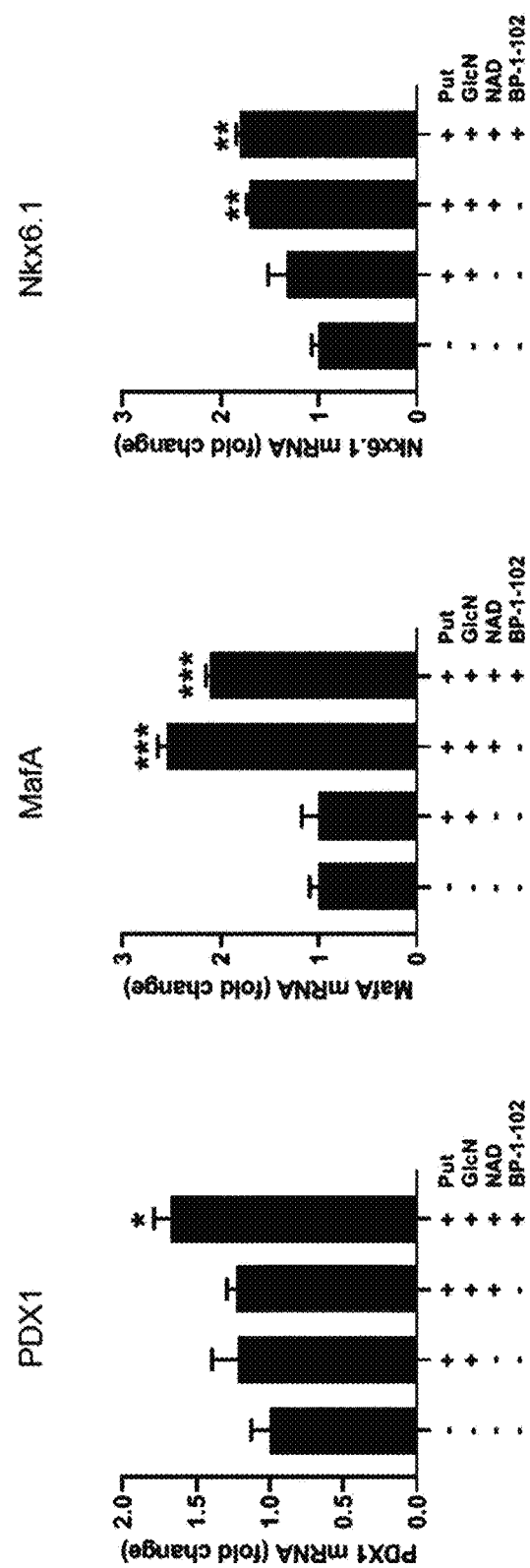
FIG. 4 is a set of views illustrating the results of determining the effects of the concomitant administration of putrescine, glucosamine, nicotinamide, and a STAT3 inhibitor in MIN-6 cells, according to an exemplary embodiment of the present invention, on the expression levels of factors involved in insulin secretion by real-time PCR.

To confirm whether the concomitant administration of putrescine, glucosamine, nicotinamide, and a STAT3 inhibitor affects the expression levels of genes associated with insulin secretion, MIN-6 cells were treated with putrescine, glucosamine, nicotinamide, and a STAT3 inhibitor at the indicated combinations, and then mRNA expression levels of Pdx1, MafA, and Nkx6.1 in MIN-6 cells were examined using real-time PCR. Experimental groups include three co-treatment groups at the following combinations of the factors; the first group for co-treatment of putrescine (Put) and glucosamine (GlcN), the second for that of Put, GlcN, and nicotinamide (NAD), and the third for that of Put, GlcN, NAD, and BP-1-102, at the aforementioned concentrations for each. After 16 hour-treatment with the combinations of the factors, cells were obtained and mRNA expression of beta cell-related genes was investigated. Primers used for real-time PCR are shown in Table 1, and the results are illustrated in FIG. 4.

TABLE 1

| Sequence name | Sequence (5' -> 3') | SEQ ID NO. |
|---|---|---|
| PDX1 forward primer | GAG CAA GAT TGT GCG GTG AC | 1 |
| PDX1 reverse primer | CCT CAG ACT GCT GTC CTC AC | 2 |
| MafA forward primer | CCC GCC AAC TTC TCG TAT TT | 3 |
| MafA reverse primer | ATC CGA CTG AAA CAG AAG CG | 4 |
| Neurog3 forward primer | AGT TGG CAC TCA GCA AAC AG | 5 |
| Neurog3 reverse primer | TCT GAG TCA GTG CCC AGA TG | 6 |

TABLE 1-continued

| Sequence name | Sequence (5' -> 3') | SEQ ID NO. |
|---|---|---|
| NeuroD1 forward primer | AGA AGA GGA GGA GGA GGA TCA | 7 |
| NeuroD1 reverse primer | GGG TCT TGG AGT AGC AAG GT | 8 |
| Nkx6.1 forward primer | TTC GCC CTG GAG AAG ACT TT | 9 |
| Nkx6.1 reverse primer | CTC CGA GTC CTG CTT CTT CT | 10 |
| GAPDH forward primer | CTG CAC CAC CAA CTG CTT AG | 11 |
| GAPDH reverse primer | AGG CAG GGA TGA TGT TCT GG | 12 |

As illustrated in FIG. 4, it was confirmed that the expression levels of transcription factors involved in the maturation of beta cells, such as Px1, MafA, and Nkx6.1, were increased when putrescine, glucosamine, nicotinamide, and the STAT3 inhibitor were concomitantly administered in MIN-6 cells. PDX1 and NKX6.1 are essential transcription factors for beta cell development, and when they are deficient, beta cell maturation does not occur in an appropriate manner.

Based on those results, it could be confirmed that the composition including putrescine, glucosamine, nicotinamide, and a STAT3 inhibitor as active ingredients according to the present invention ultimately enhanced the insulin secretion process even in the normal pancreatic beta cells and increased the expression of transcription factors associated with insulin secretion and beta cell maturation.

Example 3: Hypoglycemic Efficacy of Putrescine, Glucosamine, Nicotinamide, and a STAT3 Inhibitor in Diabetes Mellitus Animal Models 3.1. Construction of Diabetes Mellitus Mouse Model Diabetes mellitus was induced in male C57BL/6 mice aged 10-12 weeks by a single intraperitoneal injection of 150 mg/kg streptozotocin (STZ, Sigma) in 0.1 mL of 0.1 M citrate buffer, pH 4.5 within 15 min of dissolution followed by 6 hour-fasting. Three-day post STZ stimulation, animals with random blood glucose value≥400 mg/dL were considered as STZ-induced diabetic mice—and used in the experiment.

Figure 5:
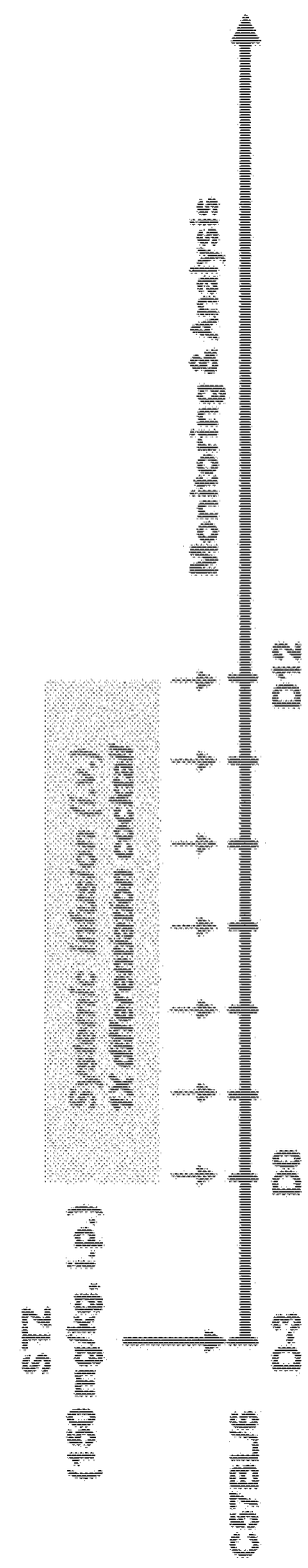
FIG. 5 is a view illustrating a summarized scheme of animal experiments performed in order to confirm the effects of putrescine, glucosamine, nicotinamide, and a STAT3 inhibitor according to an exemplary embodiment of the present invention in diabetes mellitus mouse models.

3.2. Effect of Putrescine, Glucosamine, Nicotinamide, and a STAT3 Inhibitor on the Regulation of Blood Glucose in Diabetes Mellitus Mouse Model Putrescine, glucosamine, nicotinamide, and BP-1-102, at concentrations of 200 mg/kg, 200 mg/kg, 500 mg/kg and 3 mg/kg, respectively (referred to as 1× differentiation cocktail (diff cocktail) described here), were mixed, administered every two days for 2 weeks (total 7 times) through the caudal vein to diabetes mellitus mouse models, and monitored for 2 months. The summarized scheme of animal experiments is illustrated in FIG. 5. Then, random blood glucose, body weight, and food intake were measured. The results are illustrated in FIG. 6.

Figure 6:
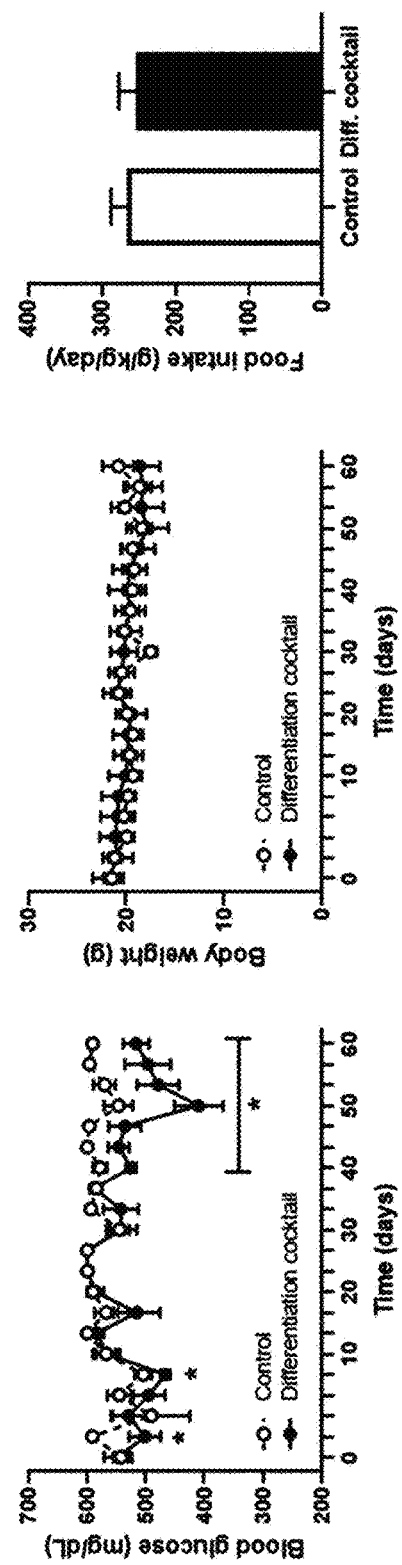
FIG. 6 is a set of views illustrating the results of confirming the effects of putrescine, glucosamine, nicotinamide, and a STAT3 inhibitor according to an exemplary embodiment of the present invention on the regulation of blood glucose in diabetes mellitus mouse models.

As illustrated in FIG. 6, it was confirmed that no significant changes between groups were observed in body weight or food intake, but in an experimental group to which putrescine, glucosamine, nicotinamide, and a STAT3 inhibitor were concomitantly administered, the random blood glucose levels were decreased significantly after day 40 compared to those in the diabetes mellitus-induced controls. Based on the results, it was determined that the blood glucose level could also be regulated in vivo when putrescine, glucosamine, nicotinamide, and the STAT3 inhibitor were concomitantly administered.

3.3. Effect of Putrescine, Glucosamine, Nicotinamide, and a STAT3 Inhibitor on Glucose Tolerance in Diabetes Mellitus Mouse Model For a glucose tolerance test, putrescine, glucosamine, nicotinamide and BP-1-102 were mixed (1× differentiation cocktail) and administered at concentrations of 200 mg/kg, 200 mg/kg, 500 mg/kg and 3 mg/kg, respectively, to diabetes mellitus mouse models constructed in the same manner as in Example 3.1, through the caudal vein over a total of 7 times once every two days for 2 weeks. On day 20, mice were fasted overnight (14-16 hours) and given an intraperitoneal injection with a 20% glucose solution at a dose 1 g/kg body weight. Blood glucose via tail vein was measured using a glucometer at the indicated time points (baseline glucose (0 minute) before and 15, 30, 45, 60, 90, and 120 minutes after glucose loading). The results are illustrated in FIG. 7.

Figure 7:
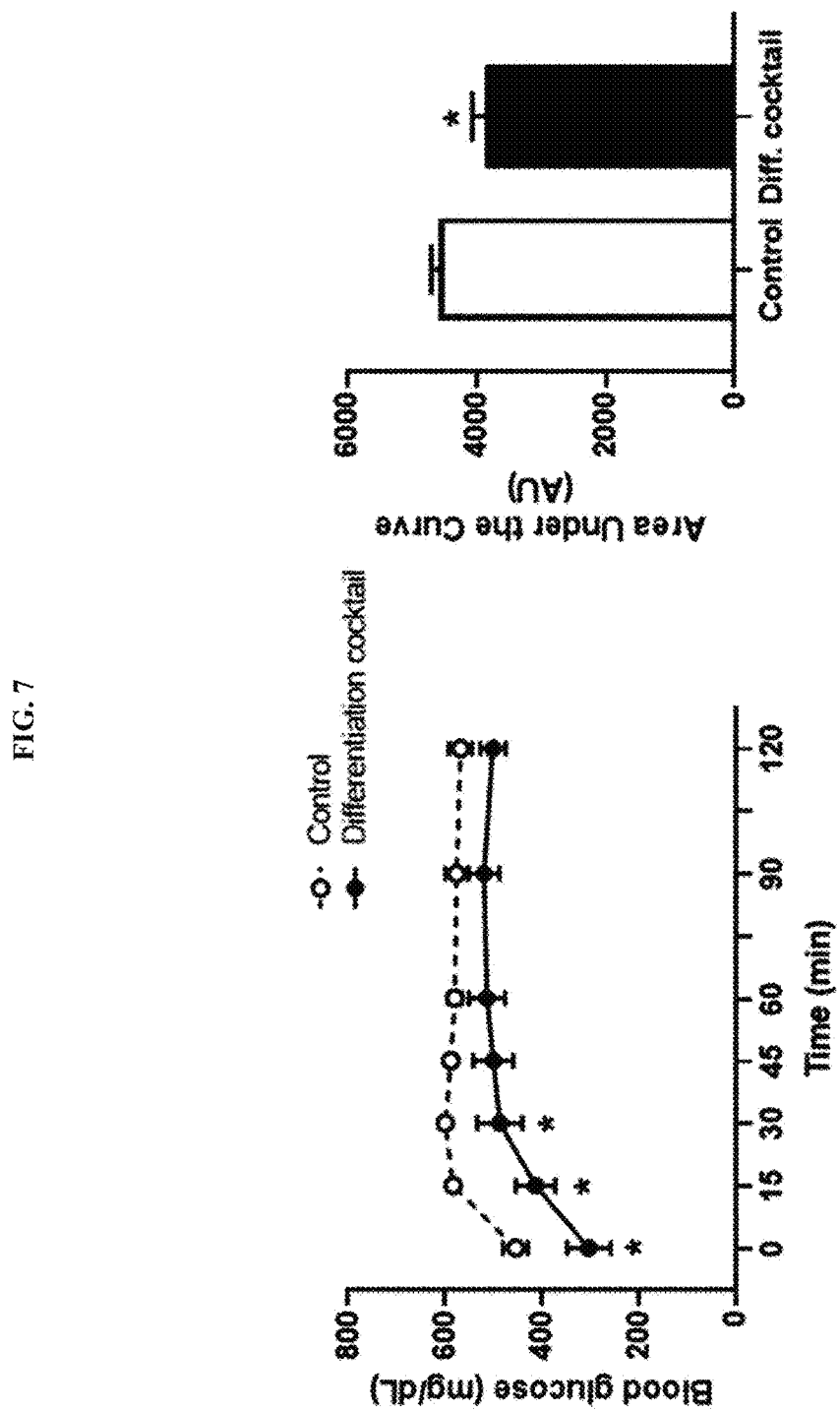
FIG. 7 is a set of views illustrating the results of examining the effects of putrescine, glucosamine, nicotinamide, and a STAT3 inhibitor according to an exemplary embodiment of the present invention on glucose tolerance in diabetes mellitus mouse models.

As illustrated in FIG. 7, it was observed that blood glucose levels were continuously lower in the experimental group concomitantly administered with putrescine, glucosamine, nicotinamide, and a STAT3 inhibitor (1× differentiation cocktail) than those in the diabetes mellitus-induced control. The degree of glucose intolerance was quantified as area under the curve (AU), which confirmed that mice administered with 1× differentiation cocktail improved glucose tolerance compared to the matched controls.

Figure 8:
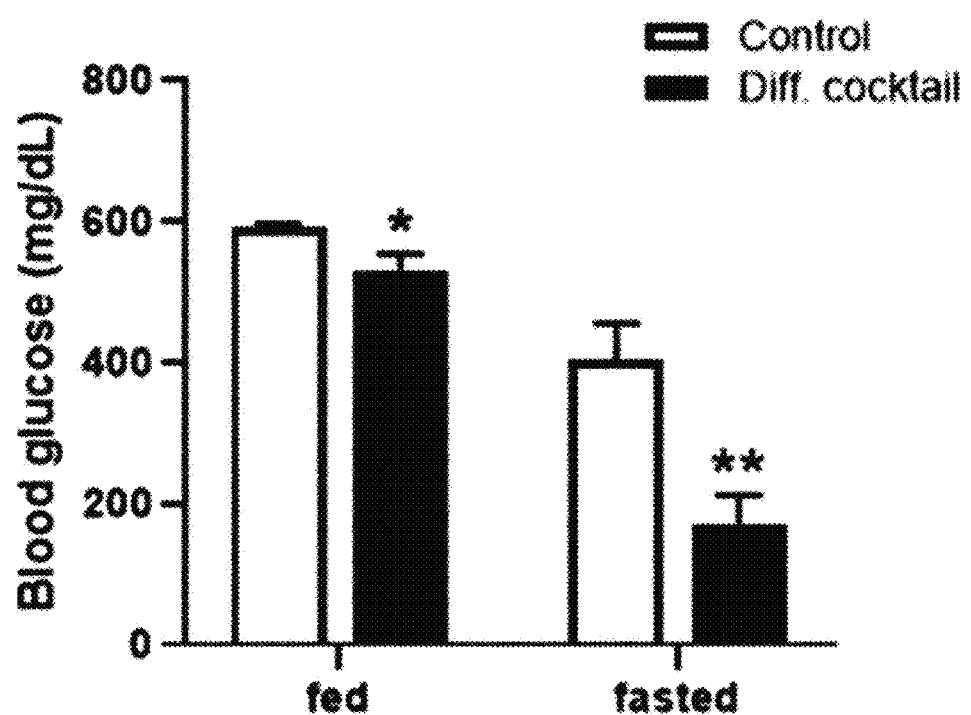
FIG. 8 is a view illustrating the results of determining the effects of putrescine, glucosamine, nicotinamide, and a STAT3 inhibitor according to an exemplary embodiment of the present invention on blood glucose levels in diabetes mellitus mouse models.

The results of random blood glucose (fed) and fasting glucose (fasted) on day 60 are illustrated in FIG. 8.

As illustrated in FIG. 8, it was shown that both postprandial and fasting blood glucose levels were significantly decreased even 60 days after administration of 1× differentiation cocktail.

From the results, it was confirmed that the concomitant administration of putrescine, glucosamine, nicotinamide, and a STAT3 inhibitor improved glucose tolerance.

3.4. Effect of Putrescine, Glucosamine, Nicotinamide, and STAT3 Inhibitor on the Presence of Insulin-Producing Cells Putrescine, glucosamine, nicotinamide, and BP-1-102 were mixed (1× differentiation cocktail) and administered at concentrations of 200 mg/kg, 200 mg/kg, 500 mg/kg and 3 mg/kg, respectively, to diabetes mellitus mouse models constructed in the same manner as in Example 3.1, through the caudal vein over a total of 7 times once every two days for 2 weeks. On day 60, the mice were sacrificed, and the pancreatic and small intestinal tissues were obtained to find whether insulin-producing cells appeared in those tissues of mice administered with 1× differentiation cocktail using immunohistochemistry against anti-insulin antibody. The results are illustrated in FIG. 9.

Figure 9:
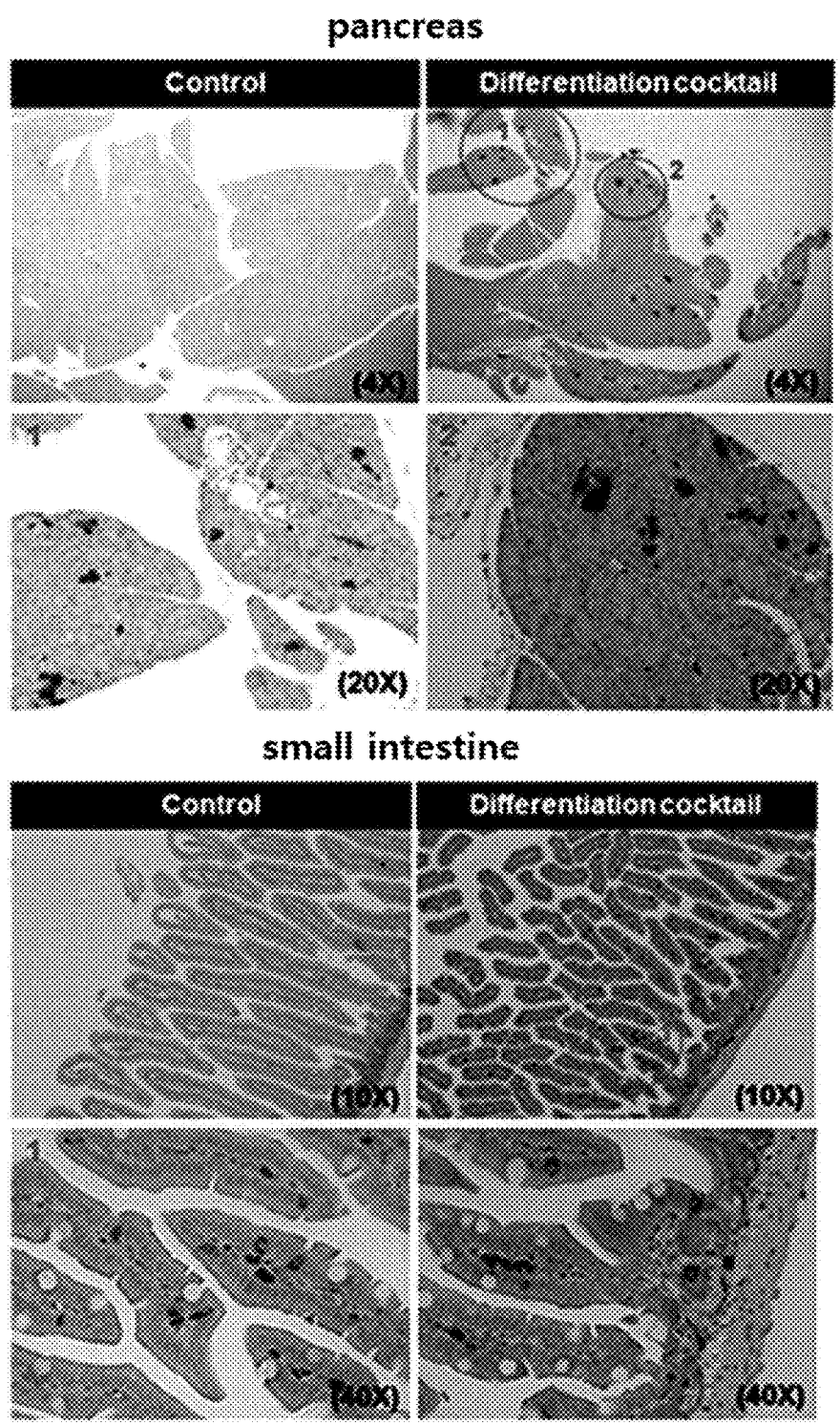
FIG. 9 is a set of views illustrating the results of observing the effects of putrescine, glucosamine, nicotinamide, and a STAT3 inhibitor according to an exemplary embodiment of the present invention on the appearance of insulin-producing cells in the pancreatic and small intestine tissues of diabetes mellitus mouse models.

As illustrated in FIG. 9, it was confirmed that insulin-secreting cells were rarely observed in the pancreas of controls, whereas a plurality of insulin-secreting cells were present in the pancreas of mice concomitantly administered putrescine, glucosamine, nicotinamide, and a STAT3 inhibitor. In addition, more insulin-producing cells were increased in the lamina propria of the intestinal villi in the presence of differentiation cocktail in diabetes mellitus animal groups. Based on the results, it could be confirmed that the composition comprising putrescine, glucosamine, nicotinamide, and a STAT3 inhibitor administered through the caudal vein as active ingredients, was delivered to the small intestine as well as the pancreas damaged by STZ to increase the appearance of insulin-producing cells, and finally, increase insulin production.

Figure 10:
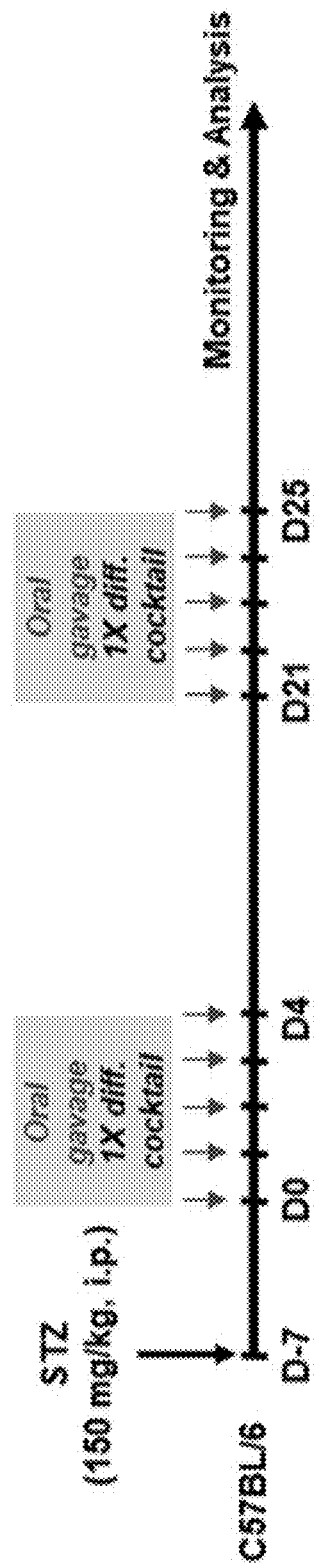
FIG. 10 is a view illustrating a summarized scheme of animal experiments performed in order to confirm the effects of repeated administration of putrescine, glucosamine, nicotinamide, and a STAT3 inhibitor according to an exemplary embodiment of the present invention in diabetes mellitus mouse models.

Example 4. Hypoglycemic Efficacy by Oral Administration of Putrescine, Glucosamine, Nicotinamide, and a STAT3 Inhibitor in Diabetes Mellitus Animal Models—Comparison with Normal Mice 4.1 Construction of Diabetes Mellitus Mouse Model and In Vivo Repeated Administration Model of Differentiation-Inducing Factor Composition In order to investigate the effects of repeated administration of putrescine, glucosamine, nicotinamide, and a STAT3 inhibitor, diabetes mellitus mouse models were generated in the same manner as in Example 3.1, and mice were administered with 1× diff. cocktail (200 mg/kg of putrescine, 200 mg/kg of glucosamine, 500 mg/kg of nicotinamide, and 3 mg/kg of BP-1-102) by oral gavage for the consecutively 5 days twice at two-week intervals and monitored the mice for 55 days. In addition to the STZ-induced diabetes mellitus animal models, normal C57BL/6 mice (Seoul National University Institute of Laboratory Animal Resources) were used for comparison to examine the in vivo effect of the diff. cocktail under the same conditions of administration. The summarized scheme of animal experiments is illustrated in FIG. 10.

4.2. In Vivo Effect of Repeated Administration of Putrescine, Glucosamine, Nicotinamide, and a STAT3 Inhibitor on the Regulation of Blood Glucose in Diabetes Mellitus Mouse Model In the mouse models prepared as described in Example 4.1, blood glucose, body weight, and food and water intake were measured for 55 days. The results are illustrated in FIG. 11.

Figure 11A:
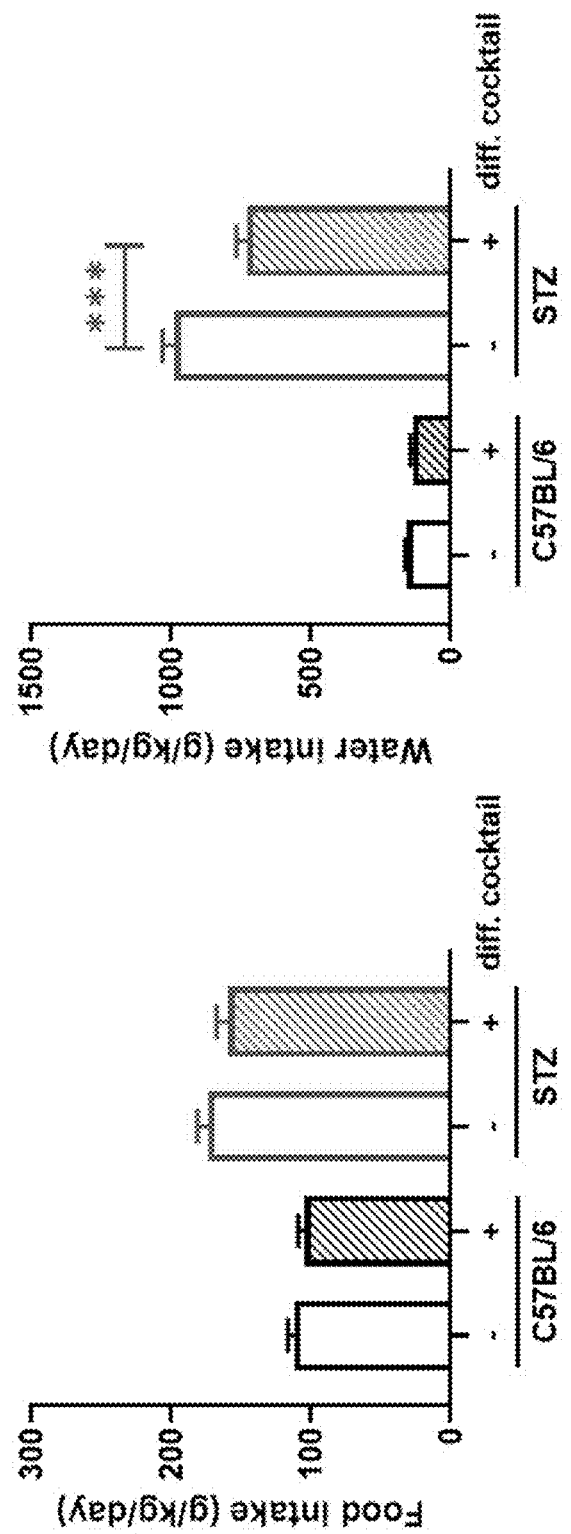
FIGS. 11A to 11C are views illustrating the results of monitoring the effects of repeated administration of putrescine, glucosamine, nicotinamide, and a STAT3 inhibitor according to an exemplary embodiment of the present invention on food and water intake, body weight and random blood glucose levels in diabetes mellitus mouse models.
Figure 11B:
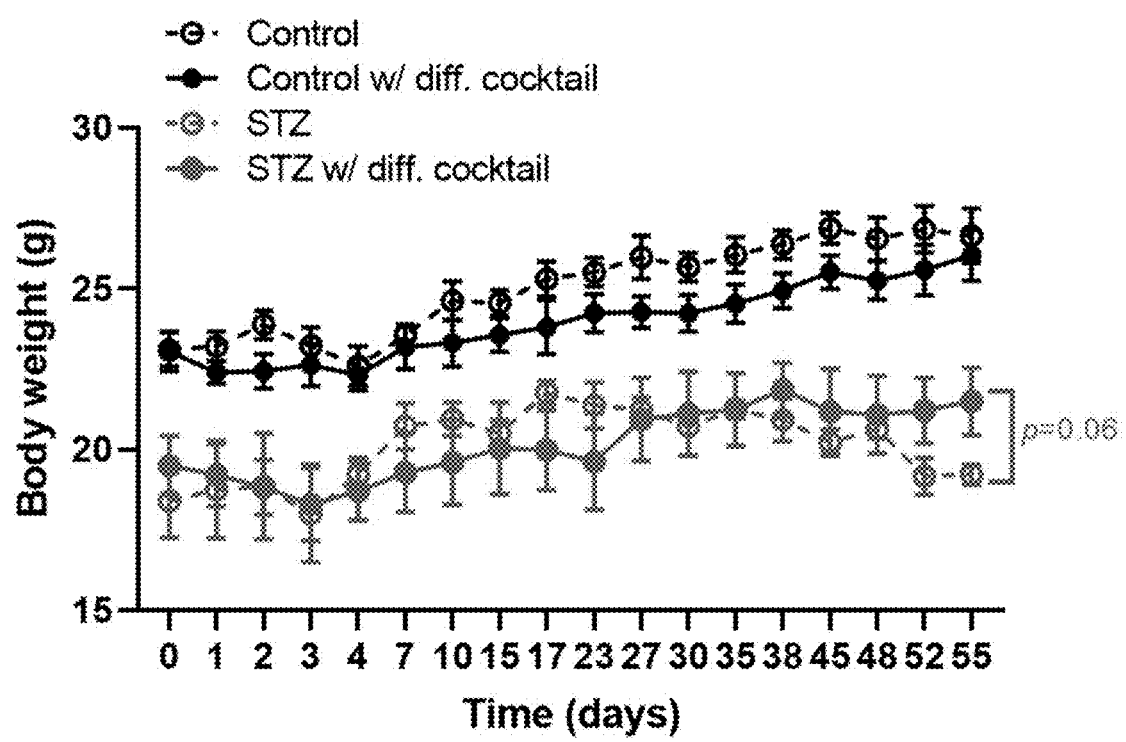
Figure 11C:
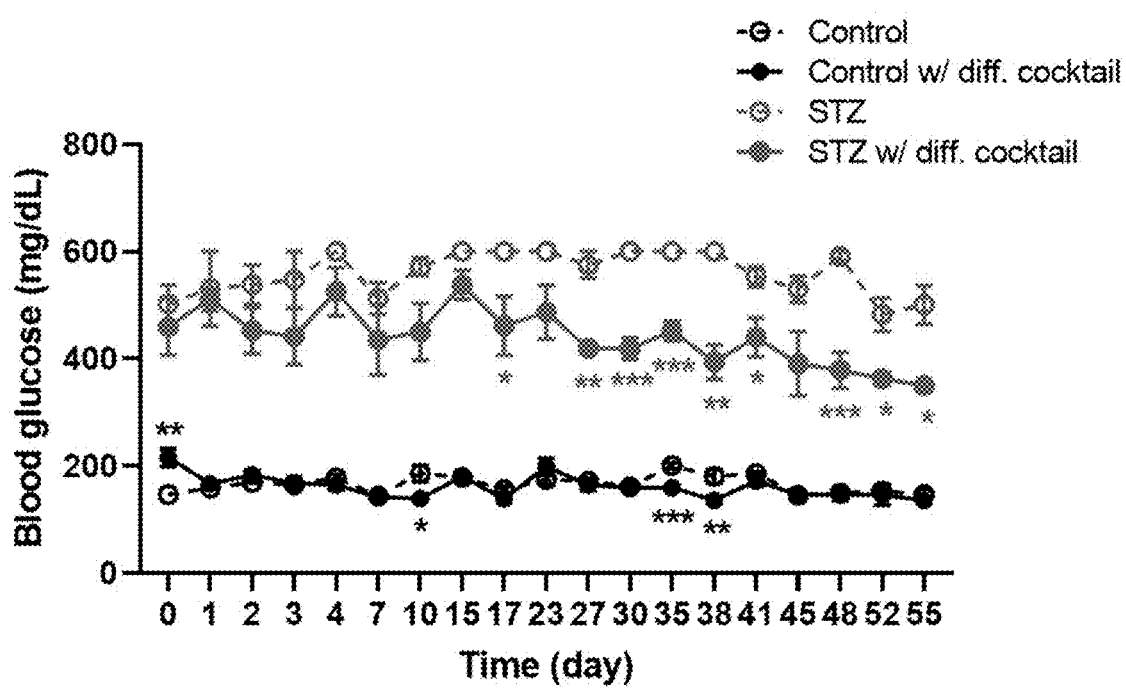

As illustrated in FIG. 11A, the animals in STZ-induced diabetes mellitus mouse model showed significant increase in food and water intake after receiving STZ stimulation. The abnormal water intake was significantly improved after diff cocktail treatment compared to vehicle-administered STZ-induced diabetes mellitus mice, but the increased food intake was not changed regardless of the presence of diff. cocktail. As illustrated in FIG. 11B, the diff cocktail-administered mice in STZ-treated group showed a modest increase but no significant change in body weight. As illustrated in FIG. 11C, random blood glucose levels in mice of STZ-treated group were noticeably elevated compared to those in normal C57BL/6 mice group. Oral administration of diff cocktail significantly decreased blood glucose levels in STZ-induced diabetes mellitus mice from day 16 to the end of the study. These results suggested that diff. cocktail comprising putrescine, glucosamine, nicotinamide, and the STAT3 inhibitor could regulate blood glucose in mice.

Figure 12A:
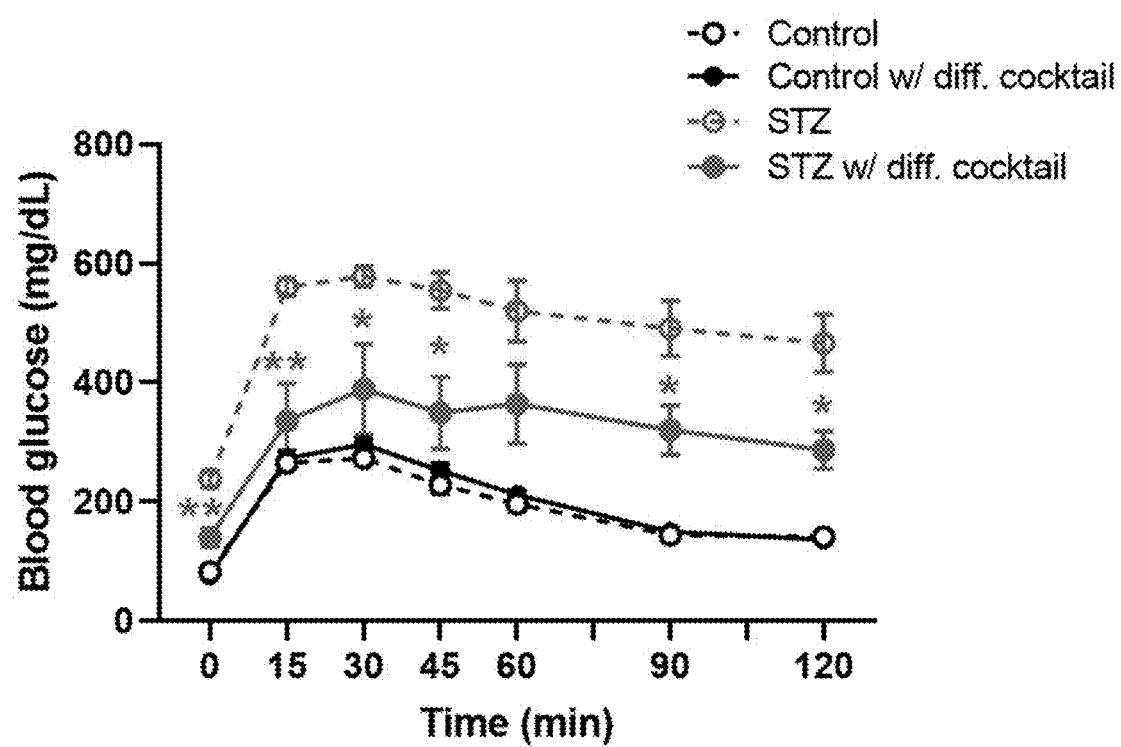
FIG. 12A is a view illustrating the results of confirming the effects of repeated administration of putrescine, glucosamine, nicotinamide, and a STAT3 inhibitor according to an exemplary embodiment of the present invention on improved glucose tolerance in diabetes mellitus mouse models.

4.3. In Vivo Effects of Repeated Administration of Putrescine, Glucosamine, Nicotinamide, and a STAT3 Inhibitor on Glucose Tolerance in Diabetes Mellitus Mouse Model The diff. cocktail comprising putrescine, glucosamine, nicotinamide, and the STAT3 inhibitor were administered to diabetes mellitus mouse models for the consecutively 5 days twice at two-week intervals as described in Example 4.1. For a glucose tolerance test, the mice were fasted overnight (14-16 hours) on day 42 and given an intraperitoneal injection with a 20% glucose solution at a dose of 1 g/kg body weight, and blood glucose via tail vein was measured using a glucometer at the indicated time points (baseline glucose (0 minute) before and 15, 30, 45, 60, 90, and 120 minutes after glucose loading). The results are illustrated in FIG. 12A. As illustrated in FIG. 12A, it was found that impaired glucose tolerance was overcome in the experimental group administered with diff. cocktail comprising putrescine, glucosamine, nicotinamide, and the STAT3 inhibitor, compared to the diabetes mellitus-induced control group.

Figure 12B:
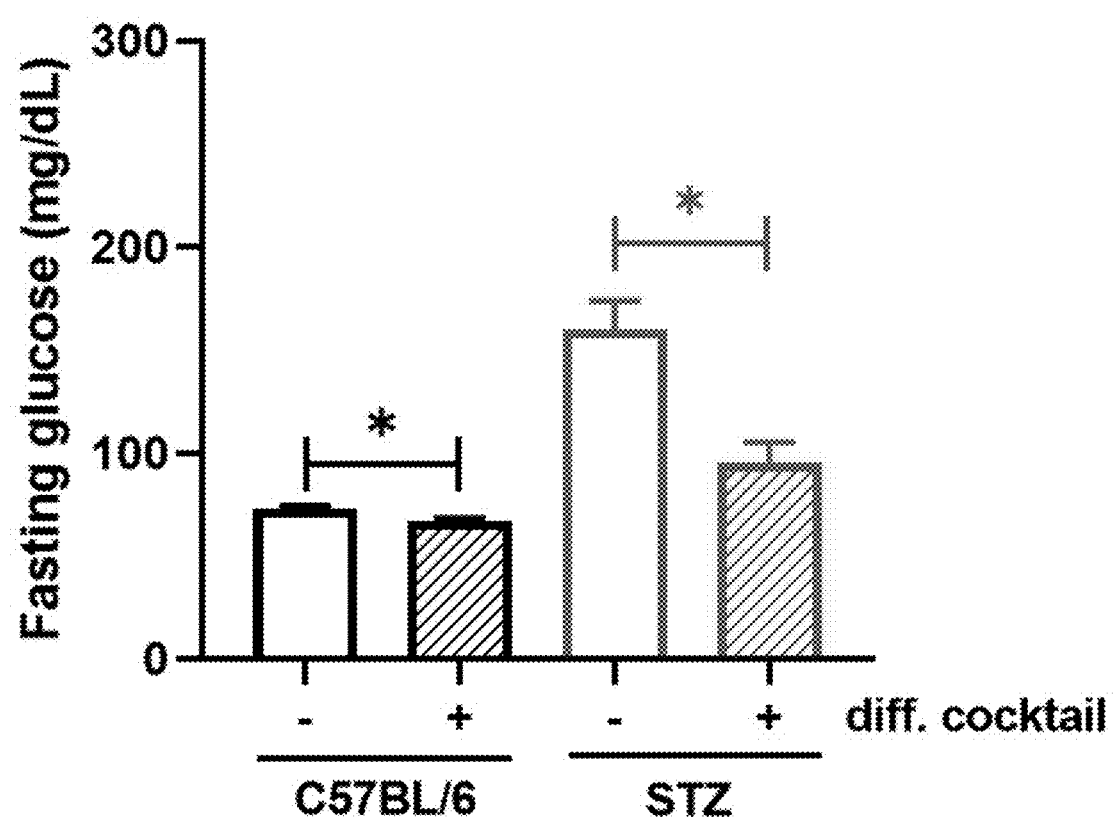
FIG. 12B is a view illustrating the results of examining the effects of repeated administration of putrescine, glucosamine, nicotinamide, and a STAT3 inhibitor according to an exemplary embodiment of the present invention on fasting blood glucose levels in diabetes mellitus mouse models.

As illustrated in FIG. 12B, fasting blood glucose levels were lower not only in STZ-treated diabetes mellitus group but also in normal C57BL/6 group administered with diff cocktail. Hypoglycemia was not induced.

To measure the fasting plasma insulin levels, mice were fasted overnight (14-16 hours) on day 55, and blood samples were collected from the tail vein. Plasma insulin levels were measured using the Mouse Ultrasensitive Insulin ELISA (ALPCO). Further, in order to quantify the insulin amount of the pancreatic tissues, pancreatic tissues were cut in half and placed into 5 mL of acid-ethanol buffer (1.5% HCl in 70% EtOH solution) overnight at −20° C. for insulin extraction. Tissues were then homogenized, incubated in the same solution overnight at −20° C., centrifuged, and the supernatants then neutralized with 1 M Tris, pH 7.5 to measure the insulin content by the Mouse Insulin ELISA kit (ALPCO).

Figure 13:
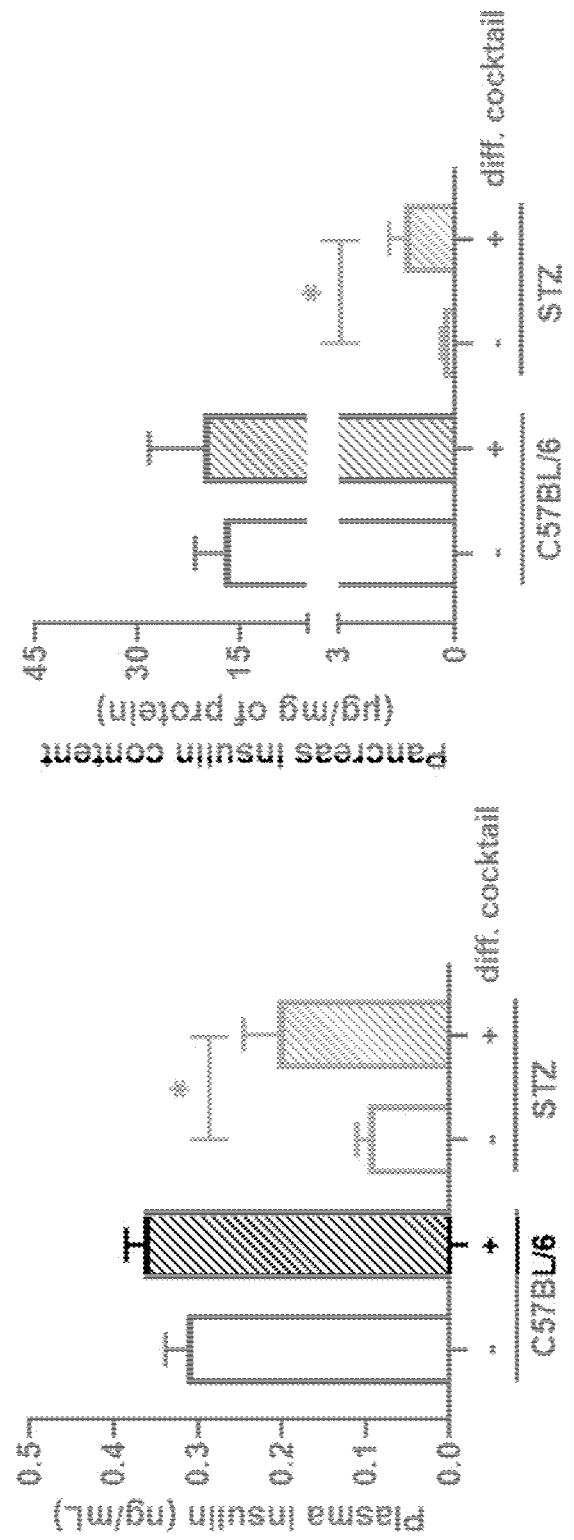
FIG. 13 is a set of views illustrating the results of investigating the effects of repeated administration of putrescine, glucosamine, nicotinamide, and a STAT3 inhibitor according to an exemplary embodiment of the present invention on the plasma insulin levels and the pancreatic insulin contents in diabetes mellitus mouse models.

As illustrated in FIG. 13, fasting plasma insulin levels as well as the pancreatic insulin contents were significantly increased in the diff. cocktail-administered diabetes mellitus mouse models. Based on the results, the in vivo efficacy of combination of putrescine, glucosamine, nicotinamide, and the STAT3 inhibitor was verified. It also would determine that the diff cocktail composition established in the present invention is functional as essential factors that could regulate the activity of endogenous stem cells, ultimately suggesting the possibility of being active in the treatment of diabetes mellitus due to beta cell destruction and damage.

Figure 14:
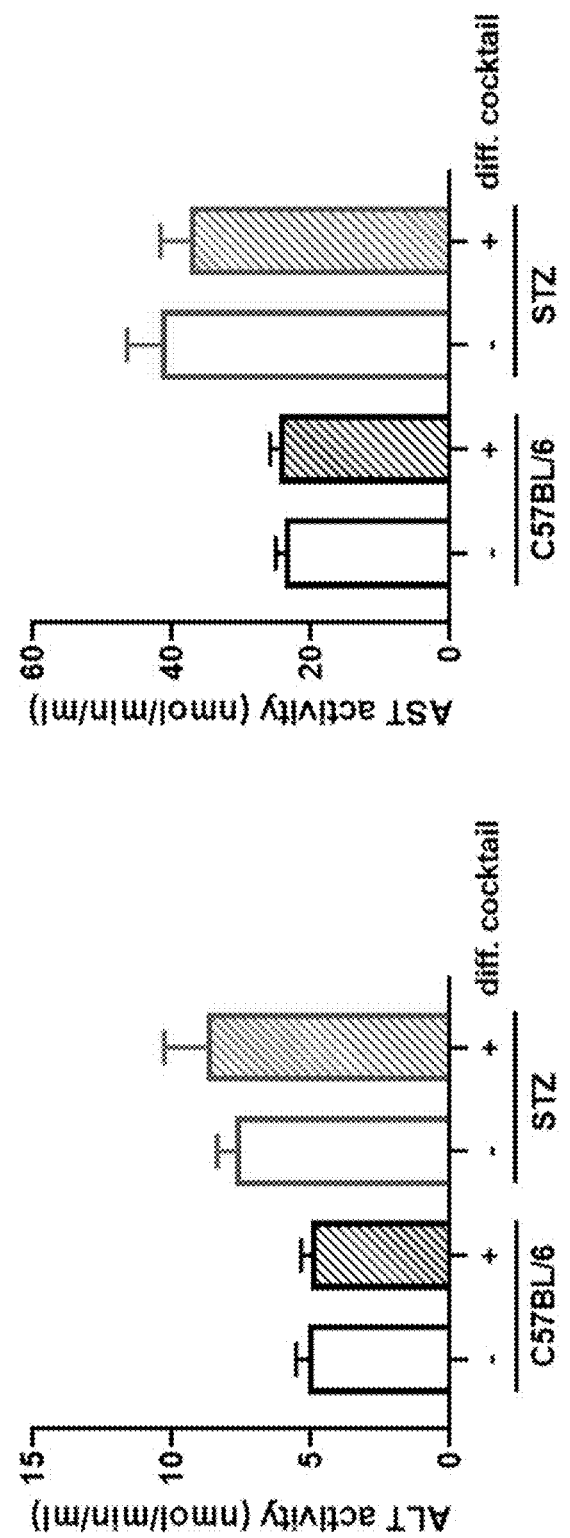
FIG. 14 is a set of views illustrating the results of examining the effects of repeated administration of putrescine, glucosamine, nicotinamide, and a STAT3 inhibitor according to an exemplary embodiment of the present invention on in vivo toxicity in diabetes mellitus mouse models.

4.4 In Vivo Toxicity of Putrescine, Glucosamine, Nicotinamide, and a STAT3 Inhibitor Plasma alanine transaminase (ALT, BioVision) and aspartate aminotransferase (AST, BioVision) activities were measured to observe the in vivo toxicity of the above-administered diff cocktail comprising putrescine, glucosamine, nicotinamide, and the STAT3 inhibitor. The results are illustrated in FIG. 14. As a result, the diff cocktail supplementation itself comprising putrescine, glucosamine, nicotinamide, and the STAT3 inhibitor didn't affect the liver damage, although STZ-induced diabetes mellitus significantly increased plasma ALT and AST activities.

Through the results, it could be implicated that bone marrow-derived stem cells mobilized (recruited) to peripheral blood due to pancreatic islet damage would react with the composition comprising putrescine, glucosamine, nicotinamide, and the STAT3 inhibitor as active ingredients according to the present invention, to promote differentiation into insulin-producing cells, and the insulin-producing cells were stably engrafted in the pancreatic islets and small intestine to increase insulin secretion and exhibit the ability to regulate blood glucose. Therefore, it suggests that the composition comprising putrescine, glucosamine, nicotinamide, and a STAT3 inhibitor as active ingredients according to the present invention may be effectively used for the treatment of diabetes mellitus.

The above-described description of the present invention is provided for illustrative purposes, and those skilled in the art to which the present invention pertains will understand that the present invention can be easily modified into other specific forms without changing the technical spirit or essential features of the present invention. Therefore, it should be understood that the above-described embodiments are only exemplary in all aspects and are not restrictive.

INDUSTRIAL APPLICABILITY

The composition including putrescine, glucosamine, nicotinamide, and a STAT3 inhibitor as active ingredients according to the present invention reacts with bone marrow-derived stem cells mobilized to peripheral blood due to pancreatic islet damage to promote differentiation into insulin-producing cells, and the insulin-producing cells are stably engrafted in the pancreatic islets and small intestine to increase insulin secretion and effectively exhibit the ability to regulate blood glucose. Therefore, it is expected that the composition comprising putrescine, glucosamine, nicotinamide, and a STAT3 inhibitor as active ingredients according to the present invention may be effectively used for the prevention, alleviation, and/or treatment of diabetes mellitus without side effects such as toxicity, and may be applied to the alleviation of various diseases associated with the regulation of blood glucose.

The invention claimed is:

1. A method for treating or alleviating diabetes mellitus, the method comprising: administering a composition comprising putrescine, glucosamine, nicotinamide, and a STAT3 inhibitor as active ingredients to a subject in need thereof.

2. The method of claim 1, wherein the STAT3 inhibitor is one or more selected from the group consisting of JSI-124, BP-1-102, and cryptotanshinone (CPT).

3. The method of claim 1, wherein the composition further comprises a stem cell mobilizing factor that mobilizes bone marrow-derived stem cells to peripheral blood.

4. The method of claim 3, wherein the stem cell mobilizing factor is any one or more selected from the group consisting of a granulocyte colony-stimulating factor (G-CSF), AMD3100, and tauroursodeoxycholic acid (TUDCA).

5. The method of claim 1, wherein the diabetes mellitus is insulin-dependent type 1 diabetes mellitus or insulin-independent type 2 diabetes mellitus.

6. The method of claim 1, wherein the composition promotes the differentiation of in vivo bone marrow-derived stem cells into insulin-producing cells.

7. The method of claim 1, wherein the putrescine is comprised at a concentration of 1 to 20 mM.

8. The method of claim 1, wherein the glucosamine is comprised at a concentration of 1 to 20 mM.

9. The method of claim 1, wherein the nicotinamide is comprised at a concentration of 1 to 20 mM.

10. The method of claim 1, wherein the STAT3 inhibitor is comprised at a concentration of 0.1 to 30 μM.

11. The method of claim 1, wherein the composition is pharmaceutical composition or food composition.

12. A method for lowering blood glucose, the method comprising: administering a composition comprising putrescine, glucosamine, nicotinamide, and a STAT3 inhibitor as active ingredients to a subject in need thereof.

13. The method of claim 12, wherein the STAT3 inhibitor is one or more selected from the group consisting of JSI-124, BP-1-102, and cryptotanshinone (CPT).

* * * * *

```
                             SEQUENCE LISTING

Sequence total quantity: 12
SEQ ID NO: 1             moltype = DNA  length = 20
FEATURE                  Location/Qualifiers
source                   1..20
                         mol_type = other DNA
                         organism = synthetic construct
SEQUENCE: 1
gagcaagatt gtgcggtgac                                                  20

SEQ ID NO: 2             moltype = DNA  length = 20
FEATURE                  Location/Qualifiers
source                   1..20
                         mol_type = other DNA
                         organism = synthetic construct
SEQUENCE: 2
cctcagactg ctgtcctcac                                                  20

SEQ ID NO: 3             moltype = DNA  length = 20
FEATURE                  Location/Qualifiers
source                   1..20
                         mol_type = other DNA
                         organism = synthetic construct
SEQUENCE: 3
cccgccaact tctcgtattt                                                  20

SEQ ID NO: 4             moltype = DNA  length = 20
FEATURE                  Location/Qualifiers
source                   1..20
                         mol_type = other DNA
                         organism = synthetic construct
SEQUENCE: 4
atccgactga aacagaagcg                                                  20

SEQ ID NO: 5             moltype = DNA  length = 20
FEATURE                  Location/Qualifiers
source                   1..20
                         mol_type = other DNA
                         organism = synthetic construct
SEQUENCE: 5
agttggcact cagcaaacag                                                  20

SEQ ID NO: 6             moltype = DNA  length = 20
FEATURE                  Location/Qualifiers
source                   1..20
                         mol_type = other DNA
                         organism = synthetic construct
SEQUENCE: 6
tctgagtcag tgcccagatg                                                  20

SEQ ID NO: 7             moltype = DNA  length = 21
FEATURE                  Location/Qualifiers
source                   1..21
                         mol_type = other DNA
                         organism = synthetic construct
SEQUENCE: 7
agaagaggag gaggaggatc a                                                21

SEQ ID NO: 8             moltype = DNA  length = 20
FEATURE                  Location/Qualifiers
source                   1..20
                         mol_type = other DNA
                         organism = synthetic construct
SEQUENCE: 8
gggtcttgga gtagcaaggt                                                  20
```

```
SEQ ID NO: 9              moltype = DNA  length = 20
FEATURE                   Location/Qualifiers
source                    1..20
                          mol_type = other DNA
                          organism = synthetic construct
SEQUENCE: 9
ttcgccctgg agaagacttt                                                     20

SEQ ID NO: 10             moltype = DNA  length = 20
FEATURE                   Location/Qualifiers
source                    1..20
                          mol_type = other DNA
                          organism = synthetic construct
SEQUENCE: 10
ctccgagtcc tgcttcttct                                                     20

SEQ ID NO: 11             moltype = DNA  length = 20
FEATURE                   Location/Qualifiers
source                    1..20
                          mol_type = other DNA
                          organism = synthetic construct
SEQUENCE: 11
ctgcaccacc aactgcttag                                                     20

SEQ ID NO: 12             moltype = DNA  length = 20
FEATURE                   Location/Qualifiers
source                    1..20
                          mol_type = other DNA
                          organism = synthetic construct
SEQUENCE: 12
aggcagggat gatgttctgg                                                     20
```